United States Patent [19]

Creekmore

[11] 4,109,238
[45] Aug. 22, 1978

[54] APPARATUS FOR VERIFYING CHECKS PRESENTED FOR ACCEPTANCE

[75] Inventor: Robert V. Creekmore, E. Marietta, Ga.

[73] Assignee: 1st Natl. Bank of Atlanta, Atlanta, Ga.

[21] Appl. No.: 619,663

[22] Filed: Oct. 6, 1975

[51] Int. Cl.$^2$ .............................................. H04Q 9/00
[52] U.S. Cl. .............................. 340/149 A; 340/149 R; 179/2 CA; 235/379; 235/432
[58] Field of Search ...................... 340/149 A, 149 R; 235/61.7 B; 179/2 DP, 2 CA

[56] References Cited

U.S. PATENT DOCUMENTS

| | | | |
|---|---|---|---|
| 3,852,571 | 12/1974 | Hall | 340/149 A X |
| 3,937,925 | 2/1976 | Boothroyd | 340/149 A X |
| 3,938,090 | 2/1976 | Borison | 340/149 A |
| 3,941,977 | 3/1976 | Voss | 340/149 A X |

*Primary Examiner*—Harold I. Pitts
*Attorney, Agent, or Firm*—Jones, Thomas & Askew

[57] ABSTRACT

A check verification system for providing customer-operated verification of checks at point-of-sale locations. The present system enables a customer to verify several possible kinds of checking functions, including verification of payroll or government checks as well as certain types of personal checks for cash, and sets limits on the number of times each checking function will be verified in a period of time. The system utilizes a number of local point-of-use terminals which are operated by the customer, and which communicate with a remotely-located transaction processor including a positive file of customers who are entitled to verify checks with the present system. The positive check verification files do not require the current bank balance of the customer, and the present system is designed to include persons who are merely the payees of checks and have no checking account or other established relationship with any bank. The present check verification system includes an identification card containing a unique number for each customer; a personal customer code, which is not on the card, is also provided for manual entry into the input terminal by the customer. Check verification is given a positive acknowledgment within the input terminal by printing information including a verification number on the back of the specific check being verified. The printed verification number on the customer-supplied check enables such checks to be factored or purchased for the benefit of the merchant who accepts checks verified by the present system.

7 Claims, 6 Drawing Figures

| 123 456 789 | AUTHORIZATION STATUS | OK |
|---|---|---|
| | | NOT OK |
| ABCDEFGHIJKLMNOPQRSTUVWXYZ | N-DAY WRONG CODE COUNT: | 0 |

N-DAY MAXIMUM: 6
N-DAY USAGE: 5

| TYPES OF CHECKS | AUTHORIZED THIS CUSTOMER | AMOUNT AUTHORIZED COUNTER | AMOUNT THIS PERIOD COUNTER |
|---|---|---|---|
| A.O.P. | YES | 4 | 2 |
| A.O.P. + $ | YES | 3 | 2 |
| CASH | YES | 2 | 1 |
| PAYROLL | YES | 1 | 1 |
| SOCIAL SECURITY | NO | — | — |
| GOVERNMENT | NO | — | — |

Fig. 4

| PAYROLL | SOCIAL SECURITY | GOVERNMENT | CHECKS NOT ACCEPTED | TODAY | READY |
|---|---|---|---|---|---|
| AMOUNT OVER LIMIT | WRONG SECRET CODE | INVALID CARD | CALL (PHONE NO.) | PURCHASE AMOUNT ONLY | GO TO SERVICE DESK |

APPARATUS FOR VERIFYING CHECKS PRESENTED FOR ACCEPTANCE

BACKGROUND OF THE INVENTION

This invention relates in general to approval of financial transactions and in particular to a system for verifying checks which are being presented or cashed at locations other than the drawee bank.

Checks are widely used as a form of payment in many consumer transactions with various retail suppliers of goods and services, and the potential risks arising from acceptance of checks by merchants and others are well known. Certain types of businesses have historically done substantial volumes of business with customers who prefer to pay by check. In addition to accepting checks drawn for the amount of a purchase, moreover, many stores will accomodate their customers by cashing personal checks, payroll checks, or the like. Next to banks, for example, it has been estimated that food stores cash more checks for the American public than any other facility, but most businesses need to accept checks at least some of the time from some of their customers. Anyone who undertakes to cash checks for other persons must have some way of assuring himself that these checks will ultimately be collectible, or at least substantially minimizing the number of uncollectible checks.

Numerous techniques have been used to reduce the acceptance of checks which turn out to be "bad", i.e., uncollectible for whatever reason. The simplest and most obvious technique is, of course, to cash checks only for customers who are personally known to the person cashing the check, but this technique is impractical for application in all but a small number of locations where checks are accepted only from repeat customers whose established financial capability and honesty are known. The more typical commercial practice employs manual check cashing files, usually established and used only by each particular store in conjunction with bad-check lists prepared by banks and other agencies and periodically circulated to merchants.

Telephone verification of each check, in which the merchant telephones the drawee bank to determine whether the person drawing the check has sufficient funds currently on deposit to cover the amount of that check, is another technique which is sometimes used. Telephone verification, as well as the maintenance and manual look-up of check cashing files, bad-check lists, and the like require a substantial amount of time and effort on the part of store personnel, and often cause queueing problems at the check-out lanes or courtesy desk of any stores. Whatever the system, some checks will be accepted and subsequently dishonored, requiring further time and effort in the attempt to collect from the person who presented the check.

Prior techniques for verifying checks have generally relied on what is known as a "negative file" of information, that is, a file containing information only on those persons who have previously passed a bad check. While information on a negative file will direct attention to persons having a past history of dishonoring checks, a negative file obviously provides no information for making a positive decision to accept a check presented by a person who is not in the negative file.

Prior check verification systems which determine whether the person presenting the check has sufficient funds on deposit are necessarily limited to those persons having an established checking account with a particular bank. Such systems are effective only if constantly updated by all deposits and withdrawals to each customer's account. Moreover, such systems are simply unavailable for those persons who have no established checking account but who may nonetheless have bona fide reasons to cash checks. Many recipients of government checks, such as welfare and social security checks, have no established checking account or other conventional credit status and may, as a consequence, encounter difficulty in cashing such checks.

SUMMARY OF THE INVENTION

Accordingly, it is an object of the present invention to provide an improved check verification system.

It is another object of the present invention to provide a check verification system which relies on a positive information file.

It is another object of the present invention to provide a check verification system which is entirely customer-operated.

It is yet another object of the present invention to provide a check verification system which is based on a positive customer information file containing information other than information regarding the customer's account as a depositor with a financial institution.

It is a further object of the present invention to provide a check verification system which enables verified checks to be factored or purchased by the operator of the system.

BRIEF DESCRIPTION OF THE DRAWINGS

Other objects and advantages of the present invention will become apparent from the following description of the disclosed embodiment, including the drawings in which:

FIG. 3 is a detailed view of the data input keyboards of the input terminal;

FIG. 4 schematically depicts the information which is contained in a typical customer file of the disclosed embodiment;

FIG. 5 is a detailed view of the message display panel of the input terminal.

DESCRIPTION OF THE PREFERRED EMBODIMENT

Figure 1:
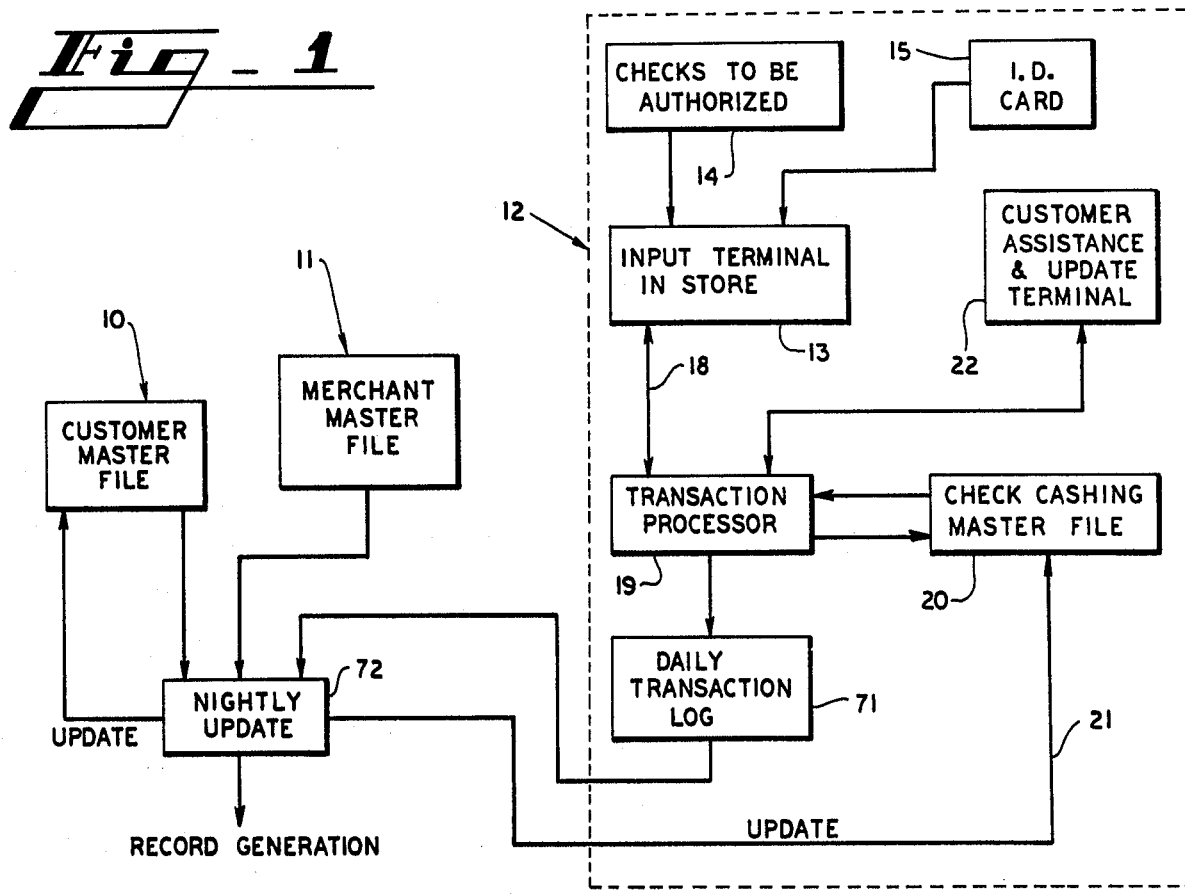
FIG. 1 is an overall schematic diagram showing a disclosed embodiment of the present check verification system.

Stated in general terms, the check verification system of the present invention maintains a positive file on customers who have been previously authorized to accomplish certain kinds of check-cashing functions. Access to information in the customer files is obtained through individual customer-operated input terminals which may be located in stores or any other point-of-use location where customers may desire to undertake checking functions. Each customer has a unique customer number, which may be encoded on a machine-readable identification card, and each customer has also previously selected a "secret" personal code which is contained in the customer files. The customer files also contain informaion relating to the types of checking functions which are authorized to each customer, the number of times each customer is expected to use each authorized checking function, within a predetermined period of time, and the maximum dollar limits for which that customer's checks will be verified with the present system. The customer supplies the system, through an input terminal, with information including his account number, his personal code, the desired type of checking function, and in some cases the dollar amount of the check being presented. This information is supplied to a transaction processor for comparison with information already stored in the files for that customer. If the desired checking function is within the previously-authorized limits contained within the files for that customer, specific authorization data for that particular check is automatically imprinted on the check at the input terminal, thereby assuring the merchant that the present check is verified for acceptance within the previously-authorized limits for that individual customer. With the aid of the present check verification system, a bank or other financial institution can cooperate with subscriber merchants to factor all checks which have been verified through the present system and which are subsequently dishonored, inasmuch as the present system effectively eliminates a very high percentage of bad checks which might have been accepted with prior art verification techniques.

Stated more particularly and with respect to the disclosed embodiment of the present invention, the portions of the present system that are utilized during an actual check authorization transaction are shown within the block 12 and include the input terminal 13 which receives a customer identification card 15 and a check 14 to be authorized. It will be understood that the input terminal 13 is but one of many such input terminals which are associated with a typical system designed according to the present invention. Each input terminal 13 is connected through the data link 18 to the transaction processor 19. The check cashing master file 20 is connected to provide the transaction processor 19 with information on which the decision to authorize a particular check for a particular customer will be made, as set forth more fully below. The information in the check cashing master file 20 may be updated from time to time by information supplied along the line 21. It will become apparent tha the transaction processor 19 may be a programmable general-purpose digital computer, in which case the check cashing master file 20 may be provided by information contained on any suitable data storage medium such as disc files or the like. Access to the transaction processor 19 may also be obtained through the customer assistance and update terminal 22, which may take the form of one or more centrally located input-output terminals, such as CRT terminals of the like, at the control of the system supplier and enabling the current status of information on the check cashing master file 20 to be reviewed as desired. The customer assistance and update terminal 22 also enables information in the check cashing master file 20 to be updated at any time as necessary to reflect the current check-cashing history of customers in the present system. For example, the fact of a check which has been dishonored by such a customer would be entered through the terminal 22, so that such information would become immediately available in the check cashing master file 20. Moreover, payment by a customer of a previously-dishonored check would also be entered into the check cashing master file 20, so as to provide a basis for re-establishing that customer's check authorization credibility within the present system.

Customers who desire to have their checks verified with the present system will have previously applied for check cashing privileges. Each customer's application should state one or more types of checks which he intends to cash or write, and have verified with the system, as well as the quantities of such checks which he expects to verify periodically. Such check types, sometimes herein called "checking funtions", may include checks written for the exact amount of a purchase, checks for the amount of a purchase plus an additional sum of cash, personal checks for cash, payroll checks, government checks such as social security or welfare, and possibly other types of checks. A person specifying payroll checks, for example, will also specify the frequency with which he is normally paid, e.g., weekly, twice monthly, or the like. A person who specifies check for amount of purchase, for example, will be asked to state the number of such checks which the person normally cashes weekly. Each applicant will also select his own unique "personal code", which is preferably any N-digit alphanumeric code. In a specific example of the present system, the personal code can be up to four alphanumeric digits.

Assuming that an applicant has no negative check-cashing history, such as uncleared bad checks or other factors which render that person unacceptable for check cashing privileges, the applicant is assigned an account number and is issued a check cashing identification card having the appearance of a conventional credit card. The identification card typically includes a magnetic stripe or other machine-readable means on which is recorded the customer's account number, a date on which the card expires, and possibly other information such as the customer's checking account number (if any). If more than one type or class of check verification account is provided in an embodiment of the present system, each customer's type of account may also be encoded in machine-readable form. The identification card also preferably contains raised visible alphanumeric indicia listing the name and account number of the card holder, and possibly other visible data such as the expiration date of the card and another number (such as a driver's license number) which is unique to the individual card holder. The previously-selected personal code is not contained on the identification card, either in machine-readable form or in the form of visible indicia.

A customer master file 10 is provided containing information on customers who have been approved for check cashing privileges according to the present system. Complete information on each accepted customer, including name, address, and other personal matters, as well as account number, personal code, and the types and quantities of checks which that customer has indicated an intention to cash and verify with the present system from time to time, is entered in the customer master file 10, which may be in machine-readable form. The check cashing master file 20 is also loaded with at least a portion of the information in the customer master file 10, for each customer, such as the account number and personal code of each customer, along with the types and quantities of checks which that customer designated when he applied for check cashing privileges with the present system. The customer master file and the check cashing master file will be updated from time to time as changes occur in the stored information relating to check verification for customers.

A merchant master file 11 is provided which contains the identity of each merchant or other retail outlet subscriber to the present check verification system, and such merchant information typically includes the number and locations of input terminals which are located in the stores of each merchant-subscriber. It will be appreciated that a particular merchant-subscriber to the present check verification system might be a chain of retail grocery stores having many individual stores located within the trading area covered by a particular system, with at least one input terminal being located within each such store of that merchant.

Figure 2:
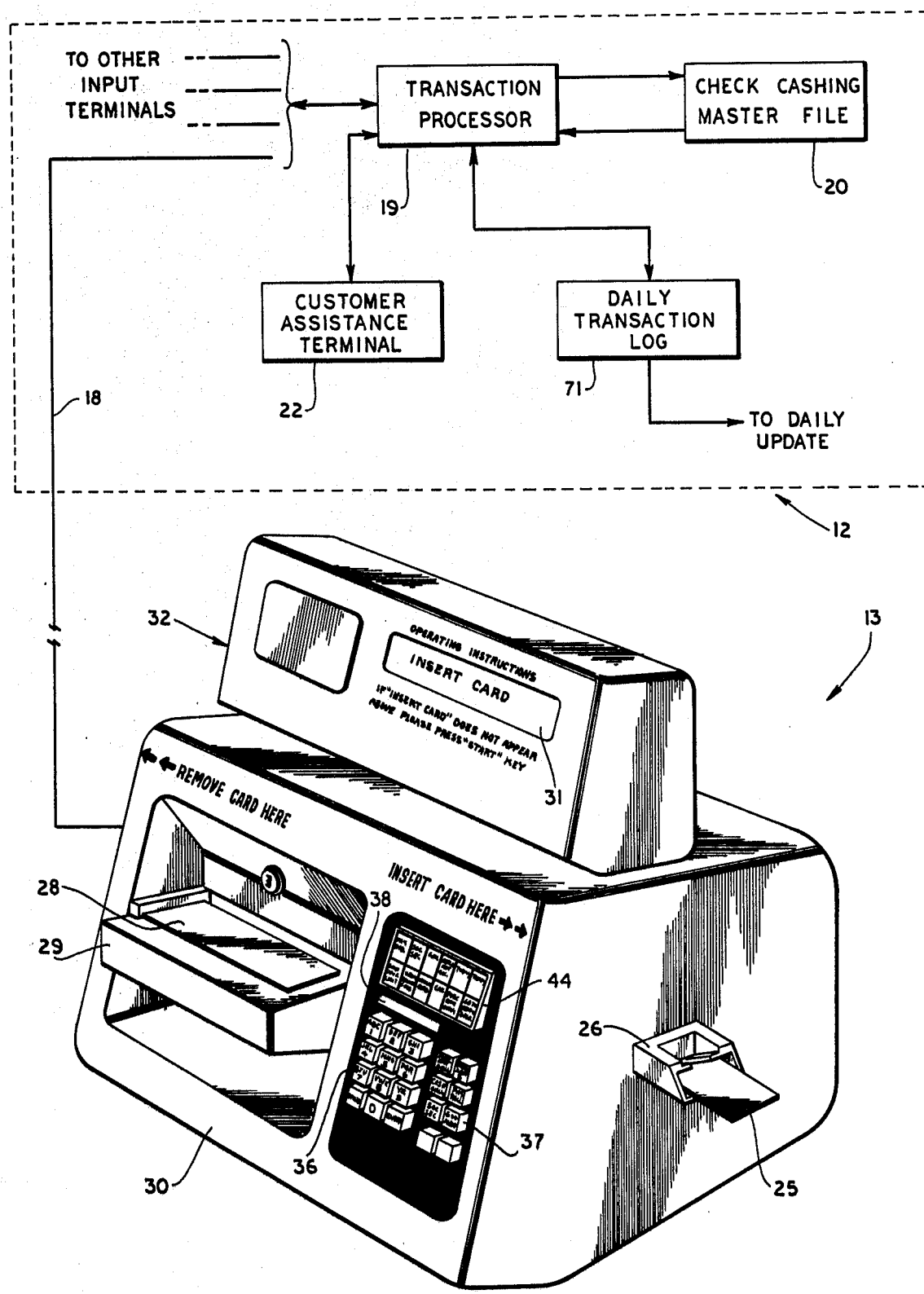
FIG. 2 is a partially-schematic diagram of the on-line portion of the disclosed embodiment, including a pictorial view of an input terminal used in the system.

The disclosed embodiment of the on-line portion 12 of the present check verification system, as shown in FIG. 2 and as encountered by the customer, is exemplified by the input terminal 13 which may be positioned at any convenient point-of-use location such as a location near the checkout lanes of a grocery store. When a customer desires to undertake a particular checking function, such as paying a presently-unknown amount for the purchase of groceries, he inserts his identification card 25 into a slot 26 provided on the side 27 of the input terminal. The customer next places a blank check 28 face-down on the check tray 29, and then slides the check tray into the opening provided in the front face 30 of the input terminal. At this time, circuitry within the input terminal detects the presence of information recorded on the card magnetic stripe and causes an appropriate instructional message to appear in the window 31 of the instruction display 32. Those skilled in the art will recognize that the instruction display 32 may be a message drum or roll which contains a number of preprinted messages relating to instructions for various operational steps on the input terminal. The first such operational step of the instruction display, commanded by the logic of the input terminal following and in response to insertion of the card and the check as aforementioned, may be an instruction advising the customer-user to press the "start" key 35, or to enter his previously-determined personal code, which the user can do through the alphanumeric keyboard 36 on the front of the input terminal.

When all N digits of the N-digit personal code have been entered via the keyboard 36, the programmed instruction display 32 operates to indicate the next instructional step, which may call for the customer-user to indicate the desired "checking function" by depressing the correspondingly-designated one of the function select keys 37. The alphanumeric keyboard 36 and the function select keyboard are shown in greater detail in FIG. 3, and it is seen that a separate function select key is provided for each check cashing function which can be authorized through the present system. In the present example, it is assumed that the customer has not passed through a checkout lane of the store and does not presently know the exact amount of the purchase selected for purchase. If the customer had depressed a function select key denoting a checking function of presently-known amount, such as a "cash only" checking function, the instruction display 32 would respond by displaying an instruction requesting the customer-user to enter the specific dollar amount in the alphanumeric keyboard 36. This dollar amount would be displayed to the customer on the input display 38, and it will be understood that any appropriate signal-responsive indicator such as light-emitting diodes or the like can be used to provide a suitable input display readout.

Customer data entry is complete at this time, and the customer-user may press the "enter" key 39 to cause the input terminal 13 to transmit the customer-entered information, as well as the machine-readable information obtained from the magnetic stripe of the identification card 15, along the data link 18 to the transaction processor 19.

The transaction processor 19, upon receiving such information from an input terminal relating to a desired check approval transaction, may perform a number of initial verification steps to determine whether the requested transaction is of a type which is subject to approval, according to standards previously determined and programmed into the particular embodiment of system according to the present invention. For instance, the information that was read from the magnetic stripe on the customer identification card 15 is compared with one or more predetermined digits, which are common to all customer identification cards intended for use with the present system, to verify that the card inserted in the input terminal 13 is actually a check-cashing card and not merely a credit card containing a magnetic stripe. The customer account number obtained from the identification card may also include information relating to the expiration date of the particular card, and that information may be compared with current-date information available to the transaction processor 19 to determine whether the card is unexpired. If the foregoing or other preliminary comparisons indicate that the transaction information received from the input terminal is based on an unacceptable identification card, the transaction processor sends an appropriate signal back along the data link 18 to illuminate the "invalid card" message 47 on the message display panel 44.

In the case of a customer identification card which is not current, the transaction processor 19 may cause both of the messages 51, "checks not accepted", and 52, "call (phone number)", to be illuminated. Calling that particular telephone number will then place the customer in contact with a customer assistance person who, with the aid of the customer assistance terminal and update 22, can advise the customer of the specific reason why the check was not accepted. The customer assistance person may, in certain predetermined circumstances, have the capability of manually entering data into the transaction processor 19 and the check cashing master file 20 which will override a prior refusal to verify a check.

If the foregoing procedure shows that the request for check authorization is based on a valid customer identification card, the transaction processor 19 next determines whether the amount-of-check information (if any) which the customer manually entered at the input terminal 13 does not exceed certain predetermined maximum amounts for the checking function which that customer selected. These maximum dollar amounts for certain checking functions will usually be the same for all customers, or for all customers within certain categories of customers as identified by information encoded into the magnetic stripe on the customer identification card. For example, it may be determined as a policy matter that checks written for "cash only" may be approved with the present system only if the check does not exceed $50, while checks such as payroll, social security, and other government checks may be approved only if the check does not exceed $200. The foregoing dollar amounts are by way of example only, of course, and it will be apparent that other dollar amounts, or separate dollar amounts for each type of checking function, may be used with the present system.

If the predetermined dollar amount for the selected checking function is exceeded by the dollar amount manually entered at the input terminal by the customer, the transaction processor 19 sends a signal along the data link 18 causing the "amount over limit" message 53 to be illuminated on the message display panel.

If the foregoing or other procedures of the verification process discover some discrepancy as aforementioned, the present request for check verification is terminated by the transmittal of an appropriate message signal to the input terminal, which also causes the input terminal to eject the identification card and the proffered check. If no such discrepancy is detected, however, the central processor 19 will now look to the check cashing master file 20 to obtain the information on the customer's file 41. If no customer file corresponding to the customer account number exists in the check cashing master file, the transaction processor sends a signal to the input terminal which illuminates the call message 52. Assuming that the appropriate customer file is available in the check cashing master file 20, such customer file look-up may include the operational step of transferring the information in that particular customer's file from the check cashing master file 20 to the transaction processor 19 while the particular transaction is being processed.

FIG. 4 is a representation of data which is typically included in an exemplary customer file 41 within the check cashing master file 20, and which includes the aforementioned account number 42 and personal code 43 previously entered for each particular customer who has been accepted for check cashing privileges with the present system. The typical customer file 41 also includes a wrong-code counter 46, which contains a record of the number of times an incorrect code has been entered for that particular customer account, over a predetermined number of days. The transaction processor first compares the personal code 43 in the customer file with the personal code which was entered by the customer at the input terminal 13. If the comparison shows that such personal codes are not identical, the transaction processor sends a signal causing the "wrong secret code" message 45 to be illuminated and also increments by one the total count contained on the wrong-code counter 46. The signal to the input terminal 13 also operates to eject the customer's identification card from the terminal, and to extend the check tray 29, whereupon the customer may reinsert his identification card and the check tray and repeat the operation with the proper code. Since repeated wrong-code attempts within a short time may signify an attempt to use a stolen identification card, the transaction processor 19 is preferably programmed to transmit a signal illuminating the "wrong secret code" message 45 and to refuse authorization of any checking functions for the remainder of a number of days if more than a predetermined number of wrong-code attempts are recorded within a certain amount of time.

Each customer file 41 also contains authorization status information at 63 which may be based on factors such as whether any outstanding bad checks prevent the approval of any type of check for that customer at the present time. The authorization information 63 might signify refusal of authorization by illuminating the messages 51 and 52 on the input terminal, if events such as outstanding bad checks, checks unpaid and written off, or the like are outstanding for the particular customer.

The customer file 41 also contains the counter 54 which contains information on the maximum number of checks which that customer may approve with the present system, in each N-day period, and the counter 55 which records the actual number of checks which have been approved for the particular customer during that N-day period. In the specific example of FIG. 4, the counter 54 shows that a total of six checks can be approved for that particular customer over the period of N-days, and the counter 55 shows that the customer has already obtained approval of five checks; this customer may obtain approval of only one more check with the present system during the relevant period. In the operation of the present system, the totals contained in the counters 54 and 55 will be periodically reset to zero at the beginning of each N-day period, so as to replenish that customer's check cashing privileges afforded by the present system.

The customer file 41 also maintains a checking function list 58 for the particular customer. The checking function list 58 includes the roster 59 of possible checking functions which can be approved with the present system, and it is seen that the listed checking functions correspond with the function select keys 37 on the input terminal. The checking function list also includes the authorization roster 60, in which is stored information indicating whether that customer previously indicated that he intends to perform the particular type of checking function. The amount authorized counters 61 indicate the quantity of each type of check which can be authorized for that particular customer during each N-day period, through the present system, and these quantities may be determined by variable factors for each particular customer, such as that customer's check-cashing history and the like.

The checks-this-period counter 62 keeps a record of the quantity of each type of check which has been previously authorized for the particular customer, during the current N-day period. The totals within the checks-this-period counter 62 are reset to zero at the beginning of each period, which may consist of several days, so as to replenish the check cashing privileges of each customer.

Assuming that the proper code was entered by the customer, the transaction processor next looks to information from the customer file 41 to determine whether the desired checking function (selected by depressing one of the function select keys 37) is authorized for that particular customer. For example, the checking function 67 designated "AOP" in FIG. 4 shows that the particular customer is authorized for approval of as many as four checks for the "Amount of Purchase Only" during a particular period, and further shows that two such checks have already been verified during that period in accordance with the present system. The checking function 68 shows that the particular customer is authorized for approval of checks for the amount of purchase plus an additional cash sum, along with information indicating that three such checks may be verified for that customer during each period.

Although a number of typical checking functions are illustrated in the roster 59 of FIG. 4, additional or alternative functions can be provided in the customer file 41.

The transaction processor 19 compares the desired checking function information, supplied from the input terminal 13, with information in the customer file 41 to determine whether the desired checking function is authorized for the particular customer, and if so, to determine whether the number in the checks-authorized counter 61 is equal to or less than the number in the checks-this-period counter 62 for that checking function. If the desired checking function is not authorized, a signal is sent to the input terminal by the transaction processor to illuminate messages 51 and 52 on the display panel 44. Such a message may, for example, invite the customer to telephone a customer assistance representative for explanation or assistance.

If the requested checking function is authorized but the number in the checks-authorized counter 61 is equal to or less than the number in the checks-this-period counter 62 for that particular checking function, the central processor may send a signal to the input terminal to illuminate an appropriate composite message. Assuming a request for authorization of a payroll for the customer account depicted in FIG. 4, for example, where the maximum number of authorized payroll checks for the particular period has already been reached, the central processor returns signals to the input terminal causing the messages 69, 51, and 70 to be illuminated, providing the composite message "payroll checks not accepted today".

In the case of certain types of checking functions where the allowable maximum number of checks this period has already been authorized, the transaction processor may be programmed to determine if an allowable check is present in another authorized checking function. For example, a request for approval of a check for the amount of purchase (AOP), or for amount of purchase plus cash (AOP+$), where the allowable limits for these checks have already been reached, may be authorized as a "cash" check, if available for that customer during that particular period.

Assuming that the requested checking function is authorized and does not exceed the allowable limit, an authorization signal is prepared by the transaction processor and is then supplied to the input terminal 13. The transaction processor also adjusts the information on the appropriate checks-this-period counter 62 to update the total number of approvals for the particular checking function during the current period. Operationally, the final step of a particular check verification transaction by the transaction processor may be the return of the updated customer file 41 to the check cashing master file 20.

Since the present check verification system may form part of a check factoring system in which checks, once so verified, are purchased by the factor without recourse, upon default, it is essential that certain information be recorded, perferably by imprinting, upon each check verified by the present system. This imprinted information preferably includes a first class of information which is predetermined for each individual customer (such as customer's name and account number) and which is contained in raised letters on the customer's identification card as mentioned above. Other information is fixed for each particular input terminal, such as a "merchant code" denoting the particular store or other point-of-use location, and the current date, which may be adjusted daily in the input terminal by store personnel.

A second class of data to be imprinted upon each verified check is variable, and is selected by printing apparatus within the input terminal 13 in response to the authorization signal supplied by the transaction processor 19. Such variable data may include symbols indicating the type of approved checking function (e.g., amount of purchase only, cash, or the like), an indication of the dollar amount of the verified check (if known and entered by the customer at the input terminal, at time of verification), as well as encoded information such as a message-check digit and/or randomly-variable code which corresponds at least approximately to the time-of-day at which the particular check verification was obtained. The time-of-day encoded information and the other variable data, printed on the back of each check verified with the present system, enables store personnel to detect checks which may have been verified some time before the present point-of-use, or which may bear a forged imprint falsely purporting to be a check verification printed with the present apparatus. The variable authorization code in a specific embodiment of the present system is an eight-digit code consisting of three numeric characters which indicate the amount of the check (if previously entered to the input terminal by the customer-user), two alpha characters which indicate the type of check, and three numeric characters which contain such encoded information.

A record of each check cashing approval transaction handled by the transaction processor 19 during a particular day is maintained on the daily transaction log 71. Transaction information recorded on the daily transaction log 71 is processed at the end of each operating day by the nightly update routine 72, which revises the customer master file 10 as required for any changes in customer status resulting from the operations of that day. Such customer status change information will naturally include changes in the data found in the customer file 41 for each customer, as previously discussed, and will also include information entered through the customer assistance and update terminal 22 regarding any unpaid checks or payment of previously-unpaid checks for customers of the present system. The customer file portion of the updated information is returned to the check cashing master file 20, thereby providing a revised customer file 41 which is used for check authorization decisions in the operation of the present system during the following day. Information from the nightly update routine 72 is also typically used to generate various reports and records relating to checks which have been authorized by the present system and were subsequently dishonored, amounts owed to subscribing merchants for approved checks which were dishonored and have been purchased by the factor, merchant billing information for merchant use of the present system, and various statistical reports as desired.

Figure 6:
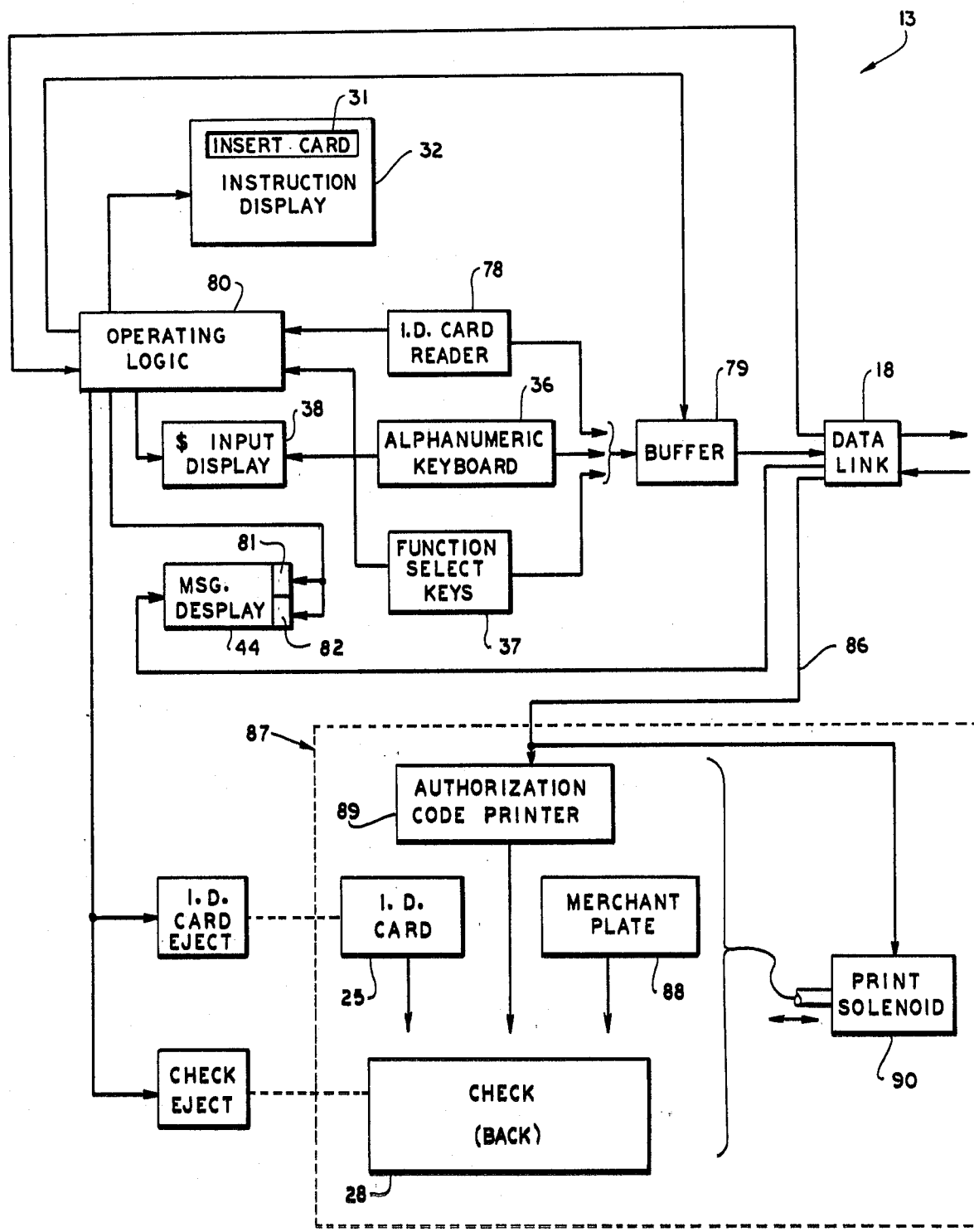
FIG. 6 is a block diagram in schematic form showing details of the input terminal.

Turning to FIG. 6, there is shown in functional form the various operational elements of an input terminal 13 used in the present check verification system, in addition to the customer-operated elements previously discussed. The input terminal includes an identification card reader 78 which senses the machine-readable information on the customer identification card, after the card is inserted into the input terminal to initiate a check verification procedure. Information obtained from the identification card by the card reader 78 is supplied to a data buffer 79 which temporarily stores such information.

The operating logic of the input terminal 13, including the logic which provides the previously-mentioned sequence of steps including operation of the instruction display 32 and the like, is under the control of the operating logic section 80 which is self-contained within each input terminal and which is preferably provided by appropriate hard-wired or micrologic circuitry. It is well within the skill of the art to provide specific logic circuitry to accomplish the operating functions of an input terminal as described herein.

The personal code information which the customer manually inputs via the alphanumeric keyboard 36, as well as the dollar amount of the check (if applicable), is also supplied to the buffer 79 for temporary storage, as is signal information from the function select keys 37 indicating the desired checking function. When the operating logic 80 determines that all preprogrammed input information requirements for a check approving transaction have been entered by the customer, the operating logic signals the buffer 79 to transfer such information (along with a coded signal which identifies the specific input terminal) to the data link 18 for transmission to the transaction processor 19 as aforementioned. The data link 18 is, in many applications of the present system, provided by dedicated telephone lines interconnecting the several input terminals 13 with the transaction processor, although dial-up lines can be used if the greater delay can be tolerated. Those skilled in the art will realize that the data link 18 may also include one or more terminal controller stages, interposed between a number of input terminals and the transaction processor, for the purpose of coordinating data flow between the input terminals and the transaction processor. The nature and use of terminal controllers to coordinate operations of local terminals is known to those skilled in the art and need not be explained herein in further detail.

The instruction display 32 is controlled by the operating logic section 80, as mentioned above, and the input readout display 38 indicates dollar amounts entered into the alphanumeric keyboard 36 by the customer-user. The operating logic preferably prevents the customer-entered personal code from appearing on the input display 38, however, since the customer will not desire to have his personal code displayed to bystanders.

The message display panel 44 is operated in response to signals from the transaction processor 19 as previously mentioned, with the exception of the "ready" message 81 and the "go to service desk" message 82 which are under the control of the operating logic 80. The "ready" message is normally illuminated when the input terminal is ready to receive an identification card, and may be illuminated when the "start" key 35 on the alphanumeric keyboard 36 is pressed. The message 82 may be illuminated in response to certain types of malfunction in the local terminal.

The authorization signal, which is generated by the transaction processor when a desired checking function is verified as previously mentioned, is supplied along the line 86 to the imprinting section 87 of the input terminal 13. A customer-supplied form, such as the check 28 which was previously inserted in the check tray 29, is positioned in alignment with the printing elements of the imprinting section 87. These imprinting elements, in a specific embodiment of the present invention, include the raised indicia embossed on the customer identification card 25, the merchant identification plate 88 (which may include a manually-adjustable date stamp), and the variable printer 89 which responds to the authorization signal from the transaction processor to print the specific authorization code generated by the transaction processor. The variable printer 89 may, for example, have a number of movable print wheels or other print elements which are positioned in response to the authorization signal. It is considered that the design and construction of a input terminal 13 is within the skill of the art, as exemplified by the input terminal shown in U.S. Pat. No. 3,898,622.

It will be understood that the print solenoid 90 is actuated to accomplish the imprinting operation only after the adjustable print elements of the variable printer 89 have become adjusted in response to the authorization signal from the transaction processor. Fixed and variable information is printed on the check (or other customer-supplied form) by momentarily bringing the check into printing juxtaposition with several printing elements including the identification card 25, the merchant plate 88, and the printing elements of the variable printer 89. Printing can thus be accomplished either by momentarily moving the check (on its supporting tray) into printing juxtaposition with the printing elements, or by momentarily moving the aforementioned printing elements into printing juxtaposition with the check on the check tray, or both.

It is apparent from the foregoing that the present check verification system allows the individual customer to obtain verification of checks, including imprinting on the customer-supplied check of specific authorization data which is necessary for the special handling of checks which may be involved in a subsequent operation such as check factoring or the like, without requiring the intervention of anyone such as store employees or a special terminal operator. The merchant can accept the verified check, knowing that he will be paid by the factoring agency if the check should default. Since the present system relies on a positive information file which does not require current checking-account balances of the customers, this system extends check verification services to include customers who have no checking account or any other kind of positive credit status.

An actual embodiment of the present check verification system has been constructed and satisfactorily tested, in which the functions of the transaction processor 19 and the check cashing master file 20 are provided by an IBM System 7 digital computer, appropriately programmed to perform the foregoing operations. Programming of that particular computer or comparable general-purpose digital computers to accomplish the operational steps described herein is within the ability of the programmer of ordinary skill in the art.

The specific limitations on quantities and dollar amounts of checks, contained in each customer file 41, may be varied upwardly by adaptation to the demonstrated history of individual customers, so that each individual customer can accumulate a check verification status which may be determined by a data base including his own historical use of the present check verification system. The information in the customer files may include information commonly associated with negative check-cashing files, such as any uncollectible checks cashed by a customer. In most cases, for example, a customer who has an outstanding uncollected check should be unable to obtain check verification with the present system until the customer file indicates that he has paid the uncollected check.

Although the foregoing relates to a specific disclosed embodiment of the present invention, it will be understood that numerous alterations and modifications may be made therein without departing from the spirit and the scope of the invention as defined in the following claims.

I claim:

1. System for verifying the check presentation history of a number of persons who may present various types of checks for acceptance, irrespective of their current checking account status or availability of such persons, comprising:

at least one input terminal disposed at a location where checks may be presented for acceptance by customers;

said input terminal having means operative to accept and read any of a plurality of customer identification cards each of which contains machine-readable information corresponding to an individual customer and also operative to produce a customer identification signal in the input terminal;

said input terminal having variable data entry means operable by the customer to provide a code input signal corresponding to a predetermined personal code whic has been previously selected by the customer;

said input terminal having form handling means operative to receive a customer-supplied form suitable for imprinting;

said input terminal having means operative to print authorization indicia on said customer-supplied form in response to an authorization signal supplied to said input terminal;

said input terminal having function selection means operable by the customer to provide check category signals corresponding to certain predetermined categories of checks which may be presented for acceptance;

data transmission means operative to supply information signals including said customer identification signal, said code input signal, and said category signal from said input terminal to a remote location;

transaction processing means disposed at said remote location and connected to receive information signals from said data transmission means;

said transaction processing means including information storage means operative to provide stored signals corresponding to the predetermined personal code previously selected by each customer, corresponding to certain previously authorized categories of checks which will be approved for acceptance if presented by a particular customer, and corresponding to a predetermined maximum number of times each such authorized category may be approved for acceptance for particular customers within a certain period of time;

said transaction processing means including signal processing means responsive to said stored signals and to said information signals received along said data transmission means from an input terminal to compare the personal code input signal from the input terminal with the stored predetermined personal code signal for that customer, said transaction processing means being operative in response to a comparison showing nonidentity of said input and stored personal code signals to provide a code error signal for transmission along said data transmission means to that input terminal; and said transaction processing means including means operative in response to a comparison showing identity of said input and stored personal code signals to compare a received desired check category signal with said stored signals in said information storage means to provide an authorization control signal indicating whether or not said desired category is authorized for that customer and whether the present request for acceptance will exceed said predetermined maximum utilization of such category; and means operative to transmit said authorization control signal to said input terminal.

2. System as in claim 1, wherein:

said input terminal includes a code error indicator means responsive to said code error transaction from said signal processing means to alert the customer that the personal code entered by him on said data entry means is nonidentical to the predetermined personal code in said information storage means.

3. System as in claim 1, wherein:

said transaction processing means is operative to provide a customer assistance signal in response to an authorization control signal indicating that the desired category of check is not authorized, or in response to an authorization control signal indicating that the request for a desired category of check exceeds the maximum authorized number of times the customer may obtain approval of that category; and said input terminal includes a customer assistance indicator means responsive to said customer assistance signal to provide advisory information to the customer using the input terminal.

4. System as in claim 1, wherein:

said printing means in said input terminal comprise first printing means operative to print selectively variable information symbols on said customer-supplied form, in response to information contained in said authorization control signal from said transaction processing means; and second printing means operative in response to said authorization control signal to print information which is not contained in said authorization control signal.

5. System as in claim 4, wherein:

said second printing means is operative to move said identification card and said customer-supplied form into relative juxtaposition so that information is raised indicia on said card is applied in printing relation to said customer-supplied form.

6. System as in claim 4, wherein said transaction processing means is operative to provide said authorization control signal which includes signals corresponding to said predetermined categories of check; and said first printing means is responsive to said check category signals in said authorization signal to print check category identification indicia on said customer-supplied form.

7. System as in claim 4, wherein:

said transaction processing means is responsive to the time of day to provide said authorization control signal which includes signals determined by the time of day when said authorization control signal is provided; and said first printing means is responsive to said authorization control signal to print time indicia on said customer-supplied form.

* * * * *